United States Patent [19]

Yamagata

[11] Patent Number: 4,733,364

[45] Date of Patent: Mar. 22, 1988

[54] PERIOD DETECTING CIRCUIT

[75] Inventor: Yasufumi Yamagata, Shinjuku, Japan

[73] Assignee: Coco Research Inc., Tokyo, Japan

[21] Appl. No.: 706,849

[22] PCT Filed: Jun. 20, 1984

[86] PCT No.: PCT/JP84/00322

§ 371 Date: Feb. 19, 1985

§ 102(e) Date: Feb. 19, 1985

[87] PCT Pub. No.: WO85/00228

PCT Pub. Date: Jan. 17, 1985

[30] Foreign Application Priority Data

Jun. 21, 1983 [JP] Japan .................. 58-111690

[51] Int. Cl.$^4$ .............................. G06F 7/62
[52] U.S. Cl. .................... 364/569; 364/551
[58] Field of Search ............. 364/551, 569, 554, 556, 364/575, 734, 550, 552; 123/416, 417; 377/15, 16, 20, 47, 49, 50

[56] References Cited

U.S. PATENT DOCUMENTS

| | | | |
|---|---|---|---|
| 4,306,295 | 12/1981 | Caroc | 364/569 X |
| 4,354,239 | 10/1982 | Kanegae | 364/569 X |
| 4,408,296 | 10/1983 | Robbi et al. | 364/569 |
| 4,551,813 | 11/1985 | Sanbayashi et al. | 364/569 |
| 4,575,809 | 3/1986 | Sinniger et al. | 364/569 |

Primary Examiner—Gary V. Harkcom
Assistant Examiner—H. R. Herndon
Attorney, Agent, or Firm—Murray Schaffer

[57] ABSTRACT

A period detecting circuit to identify the stop mode of a subject apparatus whose speed is measured by an input pulse, having a first memory for storing a value corresponding to the period of the pulse to be measured and second memory for storing therein a value which results from multiplying the preceding value stored in the first memory by a predetermined number. The contents stored in both memories are compared with each other to produce a stop mode detecting signal as its compared output.

1 Claim, 10 Drawing Figures

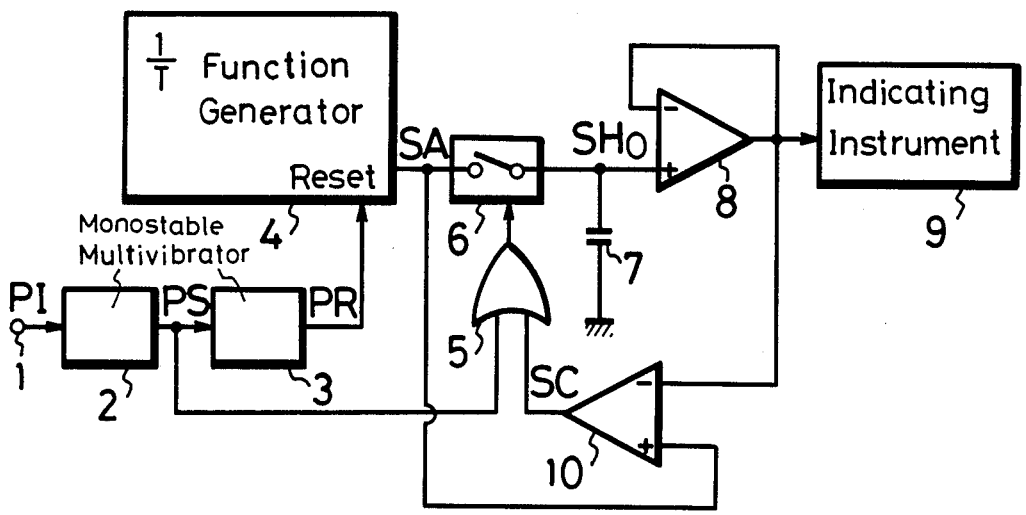
PRIOR ART FIG. 1
PRIOR ART
FIG. 2A (PS) 
FIG. 2B (PR) 
FIG. 2C (SA) 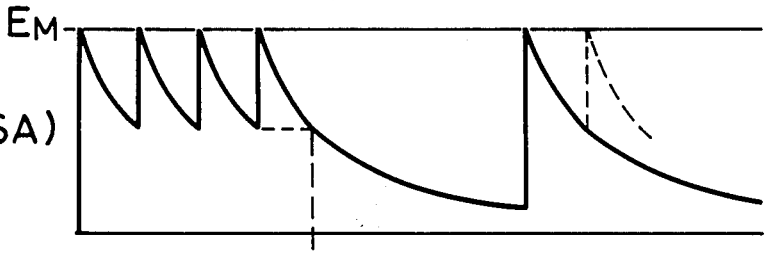

FIG. 2E (SC) 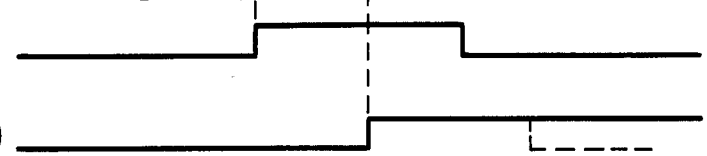
FIG. 2F (STP) 

PERIOD DETECTING CIRCUIT

BACKGROUND OF THE INVENTION

TECHNICAL FIELD

The present invention relates to a period detecting circuit capable of detecting the speed of a mechanical apparatus such as a belt conveyor or the like by detecting the period of a pulse response to the speed thereof and particularly to a circuit which can detect ultra-low speed and hence the stopping of the apparatus.

BACKGROUND OF THE INVENTION

When detecting the rotary or revolutionary speed of a device, it is general that the period of a pulse generated by a pulse generator response to the rotational speed, be converted to a voltage which is indicated by the indicator of a tachometer, which indication can thereafter be read.

In the case, however, when the rotational speed becomes low, the period of the pulse becomes so long that the indicating needle of the indicating instrument of the tachometer vibrates and hence becomes difficult to read accurately. To avoid such shortcoming, it had been proposed to connect to the pulse generator, a capacitor having a large capacitance, but this causes a defect in that the response speed of the tachometer is lowered.

The present applicant has, therefore, the object of providing an apparatus of the type aforementioned which is free of such shortcoming.

FIG. 1 shows an example of the prior art. In the figure, a train of pulses PI each having period T corresponding to the rotational speed of the apparatus being detected and derived from a pulse generator is supplied via the input terminal 1 to a monostable multivibrator 2 from which a train of pulses PS (FIG. 2A) synchronized with the pulses PI is derived. This train of pulses PS is supplied to a second monostable multivibrator 3 from which a train of pulses PR (FIG. 2B) is derived, which are slightly delayed from the pulses PS. The pulses PR are supplied to a 1/T (T being the period) function generator 4 as a reset pulse signal. Derived from the 1/T function generator 4 is a downward sawtooth waveform output SA (FIG. 2C) which has a predetermined voltage $E_M$ cresting at the time when the function generator 4 is reset by a pulse RP and which falls from the peak voltage $E_M$ in a hyperbolic fashion within the period T of the input pulse PI until the arrival of the succeeding reset pulse. Accordingly, at the time point immediately before the function generator 4 is reset by the pulse PR, the output SA, namely, the crest value of the downward sawtooth wave in the figure is equal to the voltage corresponding to the period of the input pulse PI.

The output SA from the function generator 4 is supplied to a sampling gate circuit 6, to which the pulse PS from the first monostable multivibrator 2 is also supplied, through an OR gate 5, whereby the output SA is sampled by the pulse PS and the sampled voltage thereof is stored in a capacitor 7. Since each pulse PS is the pulse just before a reset pulse PR, the output sampled by the gate circuit 6 is the downward peak value voltage of the sawtooth wave voltage SA which corresponds to the period of the input pulse PI as mentioned before. This voltage $SH_O$ (shown by a solid line in FIG. 2D) is stored in the capacitor 7 and is supplied through a buffer amplifier 8 to an indicating instrument 9, the needle of which assumes a position corresponding to the voltage $SH_O$.

Further, the output from the buffer amplifier 8 is supplied to a comparison circuit 10 to which the output SA from the function generator 4 is also supplied. This produces a compared output SC (FIG. 2E) which reaches a high level when the output SA becomes lower than the voltage $SH_O$. This compared output SC is supplied through the OR gate 5 to the sampling gate circuit 6 so that during the period in which the output SC is at high level, the gate circuit 6 is opened. Thus, the voltage $SH_O$ of the capacitor 7 is changed along the output SA in hyperbolic fashion as shown by the solid line in FIG. 2D. The output SC of the comparison circuit 10 becomes high level when the rotational speed is lowered and the period of the input pulse PI becomes long. Consequently, according to the circuitry shown in FIG. 1, the needle of the indicating instrument 9 is never vibrated when the rotational speed is lowered and the period of the pulse PI becomes long but, the amplitude of the needle is changed sequentially following the lowering of the rotational speed, so that even ultra-low speed can be detected excellently.

By the way, when the above period detecting circuit is used as a stop detecting circuit, there is then the following situation occurs:

In the circuity of FIG. 1, as the speed is lowered and the period T becomes long, the output SA is lowered hyperbolicly so that the voltage $SH_O$ obtained across the capacitor 7 corresponds thereto. If the incoming pulse PI arrives when the speed is lowered as shown in FIG. 2, the voltage $SH_O$ of the capacitor 7 is held as a low voltage, substantially corresponding to the period T at that time point and this voltage is indicated by the needle of the indicating instrument 9.

If the incoming pulse arrives without failure, there occurs no problem. However, when rotation is suddenly stopped and no incoming pulse PI arrives, then the voltage $SH_O$ follows the hyperbolic lowering of the output SA from the function generator 4. Since the voltage following hyperbolic lowering produces, in practice, an output in the shape of an asymptotic line, although movement is stopped suddenly, the amplitude of the needle does not become zero. This is inconvenient for detecting the stoppage.

In view of the above, it is the object of this invention to provide a period detecting circuit which is capable of detecting the low-speed as shown in FIG. 1 and in addition thereto capable of detecting the stoppage of rotation or the like.

SUMMARY OF THE INVENTION

Normally, in a mechanical apparatus such as a conveyor whose speed may be detected in terms of rotational speed (RPMs) or the like, speed fluctuation in use is not sharp but is gradually changed by operating a stepless transmission or the like. Thus, it is not frequent in practice that the period change of the input pulse exceeds twice although when the rotation or the like is suddenly stopped by some accident, the period of the input pulse may be changed in excess of three times.

Therefore, in accordance with this invention, there is provided means for setting a value corresponding to the period, which value is made longer by several times (N) by the sudden change of the period of the input pulse. The output of this setting means is stored in a memory means in synchronization with the input pulse PI and at time point of the pulse with the same period. Then, the value stored in this memory means and a period detecting output corresponding to the period of the input pulse, and which changes following the change of the period when the period of the input pulse becomes long, are compared with each other to therby produce a stop detecting signal as the compared output thereof.

By utilizing the aforementioned in the mechanical apparatus whose speed is to be detected and where the speed fluctuation thereof is not so rapid during normal use mode, the sudden lowering of the speed can be regarded as the stop mode when the period of a pulse to be measured which is the input pulse becomes several times (N) longer than normal. This state is judged as the stop mode and hence the amplitude of the needle can be made zero and the shortcoming inherent in the prior art circuit is removed.

In addition, this invention has an advantage that the stop detecting circuit is of a simple circuit arrangment made of only two memory circuits and a comparing circuit.

BRIEF DESCRIPTION OF THE DRAWINGS

In the drawings:

FIG. 1 is a block diagram showing an example of prior art period detecting circuit;

FIGS. 2A-F are a waveform diagram of the pulses obtained in the operation of the circuit of FIG. 1;

BEST MODE FOR CARRYING OUT THE INVENTION

In the present invention, illustrated in FIG. 3, a stop mode detecting circuit section is added to the period detecting circuit shown in FIG. 1, the arrangement of which is otherwise as described in connection with FIG. 1.

Figure 2D:
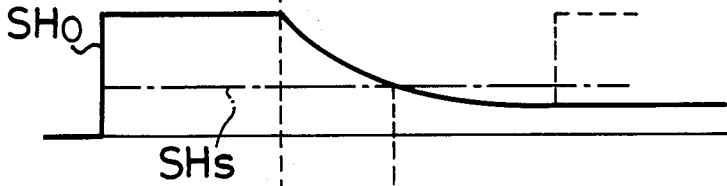
Figure 3:
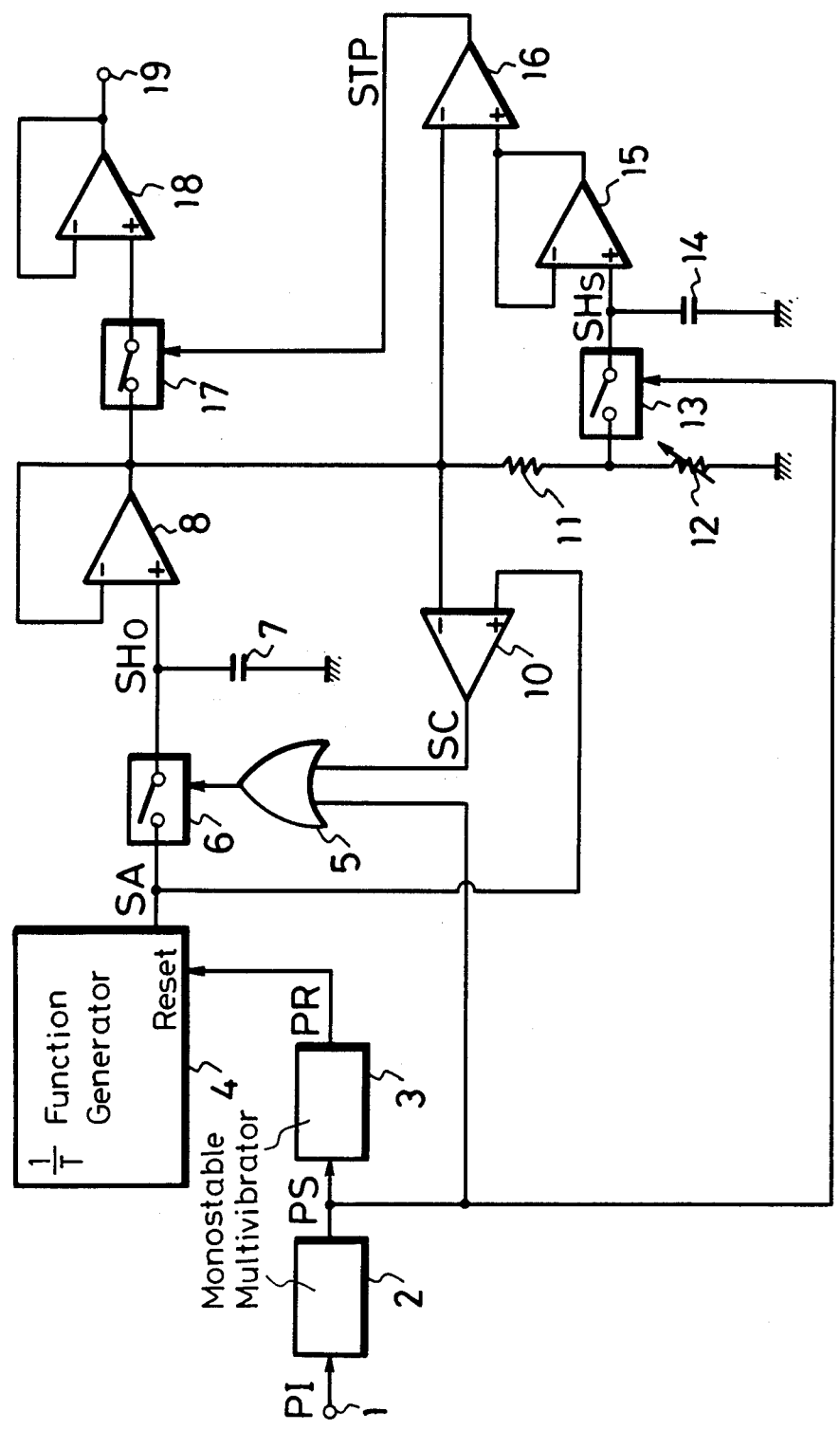
FIG. 3 is a block diagram showing an embodiment of the period detecting circuit according to this invention.

In the embodiment of FIG. 3 the voltage output from the buffer amplifier 8 is divided by resistors 11 and 12. For example, the resistor 12 is adjustable and the voltage produced at the connection point between the resistors 11 and 12 is set as $\frac{1}{2}$ to 1/5 the output voltage value of the buffer amplifier 8, namely to the value corresponding to the situation where the period of the input pulse PI is suddenly changed and becomes three to five times that of the preceding stable state. This voltage value is supplied to a sampling gate circuit 13 and is sampled there by the pulse PS. The sampled value is then stored in a capacitor 14. The output voltage $SH_s$ (shown by a one-dot chain line in FIG. 2D) stored in this capacitor 14 is supplied through a buffer amplifier 15 to a second comparison circuit 16, which is also supplied with the output of the buffer amplifier 8. The comparison circuit 16 produces a compared output STP (FIG. 2F) which reaches a high level when the output voltage stored in capacitor 7 becomes lower than the output voltage $SH_s$ stored in the capacitor 14. In other words, this compared output STP reaches a high level when the period of the input pulse PI becomes suddenly long, a state in which the subject apparatus can be regarded as in a sudden stop mode. It is needless to say that this compared output is the stop mode detecting signal.

In the embodiment of FIG. 3, when the stop mode is detected, the needle of the indicating instrument is made to indicate zero. To this end, the output of the buffer amplifier 8 is supplied through a switching circuit 17 to a buffer amplifier 18, the output of which is fed to a terminal 19 and the signal developed at this output terminal 19 is supplied to the indicating instrument 9. Then, on the basis of the output STP from the comparing circuit 16, the switching circuit 17 is controlled such that when the stop mode is detected and the output STP reaches a high level, the switching circuit 17 is turned off.

After the output STP reaches its high level and the speed of the subject is subsequently increased and restored to the original speed, as shown by a broken line in FIG. 2, an input pulse of short period arrives so that, as will be clear from FIG. 2, the voltage across the capacitor 7 is immediately increased. As a result, the output STP is lowered to the low level turning the switching circuit 17 on and thereafter, the period detection is carried out exactly similar to the steady state.

Further, the signal developed at the output terminal 19 may not be always supplied to the indicating instrument but may be used as an input to a computer which controls the operation of the mechanical apparatus which is, for example, the subject to be detected.

The embodiment shown in FIG. 3 is constructed in an analog fashion but this invention can be constructed digitally. More particularly, the above operation of this invention can be carried out by using, for example, a microcomputer having software processing. To simplify the explanation, an example of the digital construction will be described with reference to the hardware of FIG. 4 and the flow chart of the main part thereof.

Figure 4:
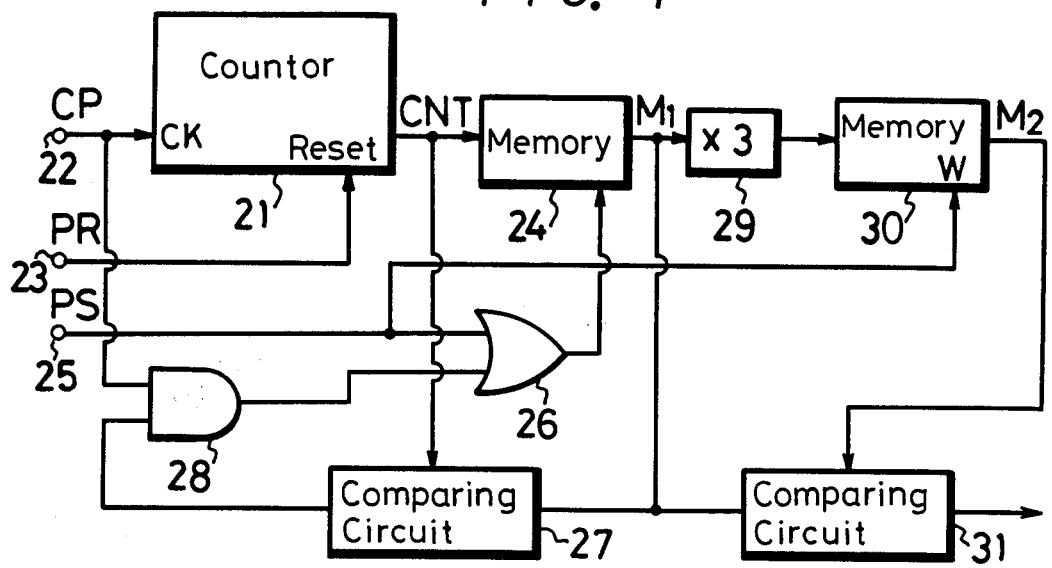
FIG. 4 is a block diagram showing another embodiment of this invention.

In FIG. 4, a counter 21 is used as the function generator for detecting the period. A clock pulse CP with the frequency sufficiently higher than that of the incoming pulse PI is supplied through a terminal 22 to the clock terminal of the counter 21. As described before, the pulse PR, synchronized with the incoming pulse PI and having the same period, is supplied through a terminal 23 to the reset terminal of this counter 21. Accordingly, the counted value of the counter 21 corresponds to the duration of the period of the pulse PR. The counted value output CNT of the counter 21 is supplied to a memory 24 and the pulse PS which is immediately before the pulse PR is applied from a terminal 25 through an OR gate 26 to this memory 24 such that the count value at the time point of this pulse PS, i.e., at the time point just before the counter is reset by the pulse PR, is stored in the memory 24. The stored value $M_1$ in the memory 24 is supplied to a comparing circuit 27 and then compared with the output counted value CNT of the counter 21. When $M_1$ less than or equal to CNT is established, the AND gate 28 is opened by the output from the comparing circuit 27, so that the clock pulse CP is derived through this AND gate 28. This clock pulse is supplied through the OR gate 26 to the memory 24 so that the content of the memory 24 is sequentially rewritten into the count value CNT on the basis of the pulse CP.

The stored value in the memory 24 thus obtained corresponds to the output value of the capacitor 7 shown in FIGS. 1 and 3.

The stored value in the memory 24 is supplied to a multiplying circuit 29 in which this value is mutliplied, for example, three times. The multiplied value is stored in a memory 30 relative to the pulse PS. Accordingly, the stored value $M_2$ in the memory 30 corresponds to the value which is provided when the period of the input pulse suddenly becomes three times greater than normal. The stored value $M_2$ in the memory 30 and the stored value $M_1$ in the memory 24 are compared with each other in a comparing circuit 31. When $M_2$ less than $M_1$ ($=$CNT) is established, the stop mode detecting signal is produced from the comparing circuit 31.

Figure 5:
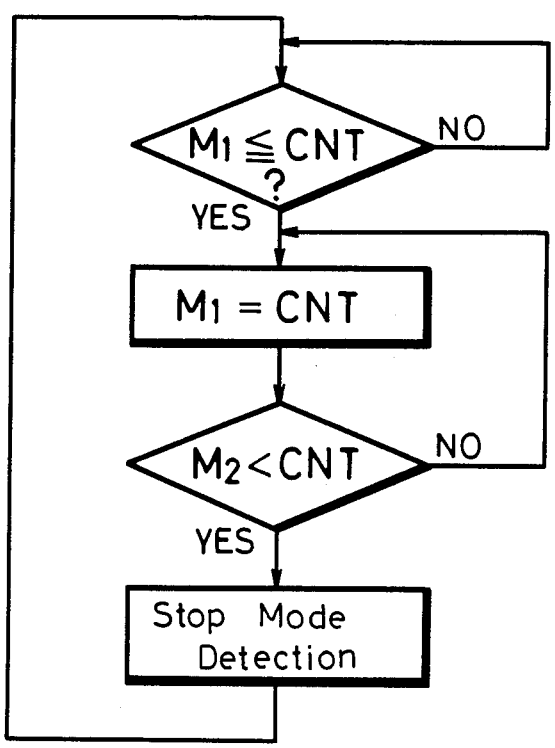
FIG. 5 is a flow chart showing the operation thereof.

FIG. 5 is a flow chart showing that when the period of the input pulse becomes longer than the preceding period and the stored value $M_1$ in the memory 24 follows the counted value CNT of the counter 24 and in addition, when the period becomes longer more than three times, the stop mode detection is carried out.

I claim:

1. A period detecting circuit to which is supplied a pulse train to be measured and producing an output corresponding to its period comprising;

(a) multi-vibrating means receiving an input pulse train containing said pulse to be measured and generating an output pulse train having pulses delayed from the pulses of said input pulse train;

(b) a function generator means controlled by said delayed pulse for generating a variable signal corresponding to the period of a pulse of said input pulse train;

(c) first memory means for storing said variable signal from said function generator;

(d) multiplying means for multiplying said variable signal by a predetermined set value greater than one with respect to time;

(e) second memory means for storing the output from said multiplying means; and (f) comparing means for comparing outputs from said first and second means and for producing a stop mode detection output when the stored value in said first memory means becomes lower than the stored value in said second memory means.

* * * * *